July 16, 1968 R. M. DE WEESE 3,392,474
ARTIFICIAL BAIT APPARATUS AND ACCESSORY
Filed Sept. 27, 1965
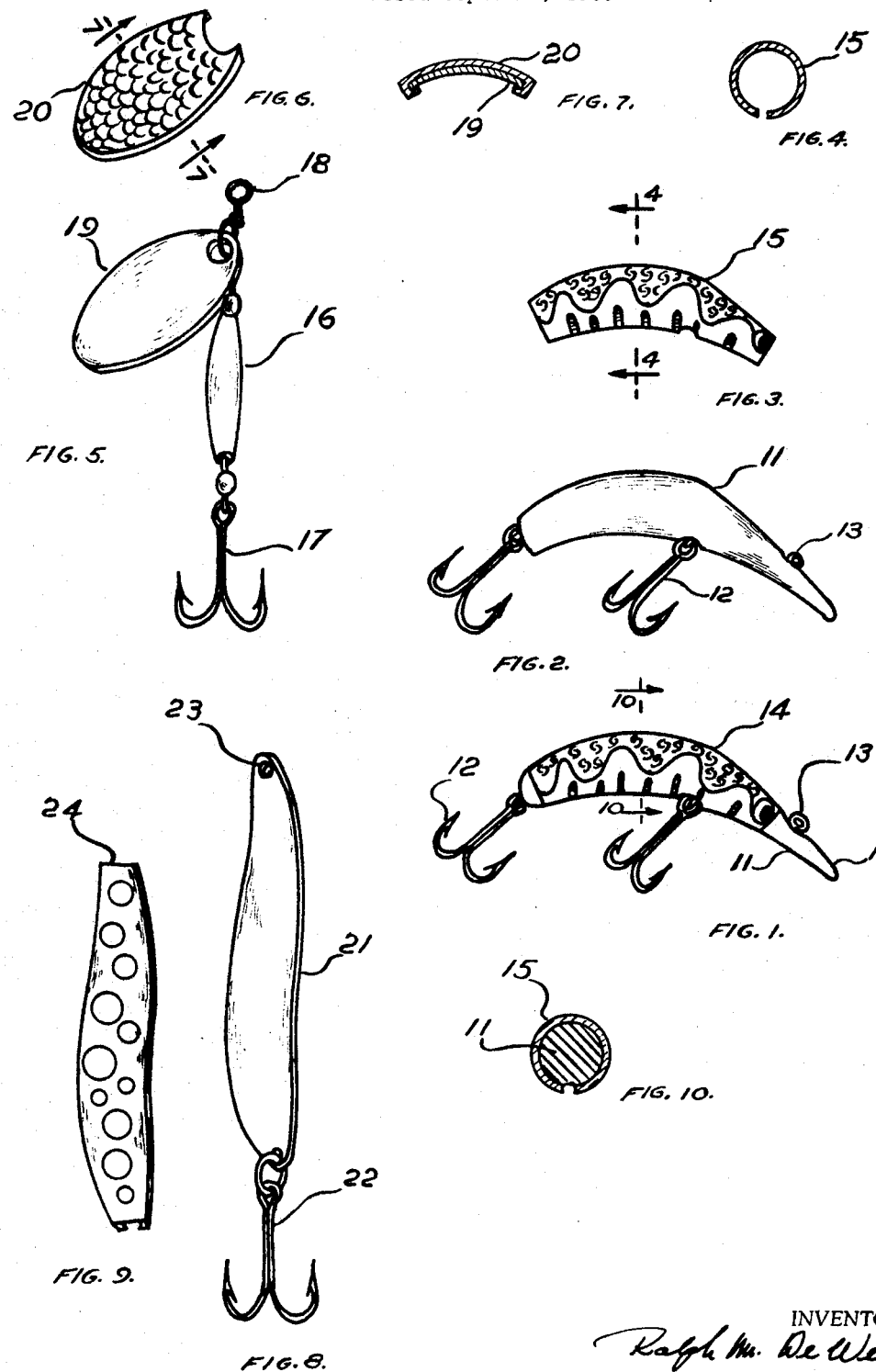
INVENTOR.
Ralph M. De Weese
BY
Ralph M. De Weese

United States Patent Office 3,392,474
Patented July 16, 1968

3,392,474
ARTIFICIAL BAIT APPARATUS
AND ACCESSORY
Ralph M. De Weese, Box 654, RI Circle Drive,
Antioch, Ill. 60002
Filed Sept. 27, 1965, Ser. No. 490,434
1 Claim. (Cl. 43—42.09)

ABSTRACT OF THE DISCLOSURE

A structure for artificial baits and fishing lures having a body to which a cover jacket of springy material having a desired color surface design or artwork can be attached by interfitting the longitudinal facing edges of the cover jacket around the body to enable the jacket to substantially surround the body. The cover jacket is removed by pressing against its edges to allow substitution of a different cover jacket.

---

This invention relates generally to angling and, more particularly, it relates to an accessory which enhances the environs of fishing while using artificial baits.

There are presently various types of artificial baits and fishing lures for angling, varying from inexpensive simple spoons with a single hook to relatively expensive lures of complex construction. Generally each particular shape or physical design comes in varied sizes from small to large. If a different color, surface design or artwork is desired of a lure having the same physical dimensions, it is necessary to procure another complete lure.

Accordingly, a principal object of this invention is to provide a new and unique advancement to the art of angling.

Another object of this invention is to eliminate the need of changing lures or artificial baits to accomplish a change of artwork, surface design or color by providing a means and method for attaching merely a jacket or cover to the lure.

A further object of this invention is to provide for each individual lure, numerous jackets or covers with each of different artwork, color or surface design to avoid the need or requirement of producing or procuring lures of the same physical dimensions merely for the purpose of obtaining differences in surface design or artwork.

Still another object of this invention is to provide for a reduction in inventory and space by eliminating the need for possessing or producing lures or artificial baits of the same physical dimensions repetitiously, merely to accomplish differences of surface appearances. This also results in lower costs to the manufacturer and consumer.

Still additional objects, benefits and advantages will become apparent from the following detailed description taken in conjunction with the accompanying drawings, in which:

FIGURE 1 is a main view of an artificial bait or lure portraying integrated surface design or artwork.

FIGURE 2 is a view of the same lure of FIGURE 1 but is without artwork or surface design and can also be described as not having a cover or jacket.

FIGURE 3 is a main view of a cover or jacket which can be described as having been removed from, or ready to be attached to the lure of FIGURE 2.

FIGURE 4 is a vertical section taken along line 4—4 in FIGURE 3 showing the split or part, the accommodation for attaching or detaching the jacket.

FIGURE 5 is a main view of another type of artificial bait, principally showing a revolving blade or spinner. The blade is also void of artwork or surface design.

FIGURE 6 is a main view of a jacket which can be described as having been removed from the revolving blade of FIGURE 5.

FIGURE 7 is a section taken generally along line 7—7 of FIGURE 6 which shows the holding and snap-on feature of the jacket so it can easily be attached or detached from the blade by hand.

FIGURE 8 is a main view of still another type of artificial bait usually referred to as a spoon. The spoon can also be described as not having a jacket.

FIGURE 9 is a main view of a jacket showing a surface design which would be used in conjunction with the spoon illustrated in FIGURE 8, as the dashed lines of the drawing indicate.

FIGURE 10 is a vertical section taken along line 10—10 in FIGURE 1 and shows a jacket tightly fitted to the main body of a lure.

Referring now specifically to the drawing, a common form of artificial bait used for fishing and usually termed a plug, is indicated generally at 10 and is comprised of a main body 11 to which is attached a pair of hooks 12 and a fishing line eyelet 13. The surface design 14, is commonly molded into or imprinted thereon and is integrated with the main body 11.

Different from the main body 11 of FIGURE 1 is the main body 11 of FIGURE 2 which is entirely void of any artwork, imprinting or surface design 14 beyond the inherent properties of the material used or what the process of manufacturing contributes and may also be described as not having a jacket 15. Main body 11 of FIGURE 2 having no artwork thereon, can so obtain the same by merely applying a jacket 15 and thus become in appearance as main body 11 of FIGURE 1.

Jacket 15 of FIGURE 3 is of shell and skin-like construction and conforms accurately to the shape and configuration of the main body 11. In order to be able to apply jacket 15 to the main body 11, a slit or part is provided. In this case it is on the lower side or bottom of jacket 15 as shown in FIGURE 4. This split or part allows jacket 15 to spread and open along the bottom sufficiently enough to pass over the main body 11. After the jacket 15 encases the main body 11 the split or part recloses due to the inherent qualities and spring tension features of the material used. This reclosing is the feature of retention for securely holding the jacket 15 onto the main body 11 and also causes the appearance after installation of integrated surface design, artwork or imprinting.

Another form of artificial bait, commonly called a spinner, is indicated generally in FIGURE 5. It has a basic main body assembly 16, a hook 17 and a fishing line eyelet 18. In addition it has a spinner or revolving blade 19 which by itself spins or revolves as the lure is drawn or pulled through the water and is the main feature of this assembled lure for attracting fish. As shown, blade 19 is void of any artwork or surface design beyond the inherent qualities of the material used but may be painted or have a plating. It can be stated that blade 19 does not have a jacket 20. Jacket 20 suggests a surface design and is fabricated to conform to the shape of blade 19 so when it is attached it appears as integrated.

Jacket 20 as used in conjunction with blade 19, does not actually have to fully encase blade 19 but merely cover, or partially cover, only the effective area which in this case is the outer face or surface as exposed to view in FIGURE 5. Consequently, jacket 20 fits onto and covers this outer face of blade 19, extends over its edges and has a slight return flange extending onto the lower or bottom face of blade 19. FIGURE 7 which is a section taken along line 7—7 of FIGURE 6 shows this feature. This return flange also provides for holding and retaining jacket 20 onto blade 19 and is referred to as a snap-on feature, which makes it quick and simple to install or remove by hand.

FIGURE 8 is still another version of an artificial bait or lure commonly termed a spoon. Like others it has similar detail, such as a main body 21, a hook 22 and a hole 23 for attaching a fishing line. Main body 21 is also blank and without a cover or jacket 24 illustrated in FIGURE 9. Jacket 24 is shown with artwork or surface design. Jacket 24 as illustrated in conjunction with the spoon or main body 21 of FIGURE 8 is viewed as having been removed or detached from the main body 21, or ready to be attached. Jacket 24 has the same return flange and retention feature as jacket 20 of FIGURE 7, though other means can be provided.

Obviously in the realm of fishing and artificial baits, all the different jackets, lures or apparatus used for catching fish cannot be feasibly illustrated or described, and though this invention is applicable to them in general, these three examples shown in the drawing do illustrate and represent the subject and its scope.

Use of this principle of angling will now be readily understood. A fisherman is casting with a spoon as illustrated in FIGURE 8 encased with jacket 24. It can be visualized that the circles on jacket 24 are red and the background is green. After several casts of nonproductive fishing, the fisherman desires to replace jacket 24 now in use with another of different surface design and selects one having green circles with a red or yellow background and finds this combination productive. It is shown here that only the jacket 24 has been exchanged and not the lure of FIGURE 8, therefore, also pointing out that this method of transformation by exchanging jackets or covers is less expensive than obtaining more than one lure, takes up less space and reduces inventory. It also points out that this transformation is done by hand and requires no tools, is simple and quick.

The various features which are believed to be new are set forth in the following claim.

I claim:
1. A fishing device such as a lure having a body with at least one hook connected thereto and means for attaching a fishing line wherein said body has a length greater than its width in combination therewith, a curved interchangeable cover jacket with a design thereon and of spring material of a length to substantially enclose and surround said body with longitudinal facing edges of said jacket extending the full length of the jacket and being turned to face toward each other at one side of the body whereby said jacket can be flexed to increase the distance between said facing edges to enable placement of the cover jacket over the body with the springiness of the material drawing said facing edges toward each other to snugly hold the cover jacket on said body, said cover jacket and body having a lesser width near the ends thereof than at the centers thereof to prevent relative movement therebetween and make the cover jacket self-locking, said facing edges being exposed to permit easy removal of said cover jacket by merely pressing against one of said facing edges.

References Cited
UNITED STATES PATENTS

| | | | |
|---|---|---|---|
| 1,599,763 | 9/1926 | Head | 43—42.09 |
| 2,003,976 | 6/1935 | Raymond | 43—42.09 |
| 2,578,411 | 12/1951 | Fisher | 43—42.09 |
| 2,598,360 | 5/1952 | Cummins | 43—42.09 X |
| 2,796,693 | 6/1957 | Gunterman | 43—42.09 |

SAMUEL KOREN, *Primary Examiner.*

J. H. CZERWONKY, *Assistant Examiner.*